United States Patent
Tejada et al.

(10) Patent No.: US 12,228,724 B2
(45) Date of Patent: Feb. 18, 2025

(54) MODULAR RECONFIGURABLE OPTICAL SYSTEMS FOR SUPPORTING MULTIPLE MODALITIES

(71) Applicant: Goodrich Corporation, Charlotte, NC (US)

(72) Inventors: John Anthony Tejada, Londonderry, NH (US); William Jeff McKinley, Westford, MA (US)

(73) Assignee: Goodrich Corporation, Charlotte, NC (US)

(*) Notice: Subject to any disclaimer, the term of this patent is extended or adjusted under 35 U.S.C. 154(b) by 681 days.

(21) Appl. No.: 17/368,928

(22) Filed: Jul. 7, 2021

(65) Prior Publication Data

US 2022/0011564 A1 Jan. 13, 2022

Related U.S. Application Data

(60) Provisional application No. 63/050,259, filed on Jul. 10, 2020.

(51) Int. Cl.
  *G02B 23/04* (2006.01)
  *G02B 17/06* (2006.01)
  *G02B 27/10* (2006.01)
(52) U.S. Cl.
  CPC ......... *G02B 23/04* (2013.01); *G02B 17/0636* (2013.01); *G02B 27/1006* (2013.01); *G02B 27/1013* (2013.01)
(58) Field of Classification Search
  None
  See application file for complete search history.

(56) References Cited

U.S. PATENT DOCUMENTS

| | | | |
|---|---|---|---|
| 5,309,276 A | 5/1994 | Rodgers | |
| 5,763,882 A | 6/1998 | Klapper et al. | |
| 5,831,762 A | 11/1998 | Baker et al. | |
| 6,400,501 B2 * | 6/2002 | Tsuchiya | G02B 7/16 359/821 |
| 6,414,805 B1 * | 7/2002 | Reichman | G02B 21/06 359/361 |

(Continued)

FOREIGN PATENT DOCUMENTS

WO    WO-2006002271 A1 *  1/2006  ......... G02B 17/0663

OTHER PUBLICATIONS

Petrushevsky, Vladimer et al., "Common Aperture Multispectral Spotter Camera: Spectro XR", Proceedings of SPIE, vol. 10433, Oct. 6, 2017, 7 pages.

(Continued)

*Primary Examiner* — Derek S. Chapel

(57) ABSTRACT

An optical system comprising includes an off-axis folded three mirror anastigmat (TMA) telescope including a primary mirror for receiving energy from a scene. A secondary mirror is aligned to receive reflected energy from the primary mirror. A fold mirror is aligned to receive reflected energy from the secondary mirror. A tertiary mirror is aligned to receive reflected energy from the fold mirror and to direct energy between the secondary mirror and the fold mirror. A beam splitter is aligned to receive energy reflected from the tertiary mirror, to reflect a portion of that energy to a first imaging sensor, and to pass a second portion of that energy to a second imaging sensor.

19 Claims, 3 Drawing Sheets

(56) References Cited

U.S. PATENT DOCUMENTS

| | | |
|---|---|---|
| 8,284,382 B2 | 10/2012 | Krasutsky |
| 10,191,275 B1 | 1/2019 | Murray et al. |
| 2010/0020307 A1 | 1/2010 | Kunick |
| 2015/0028194 A1 | 1/2015 | Cook |
| 2018/0210166 A1* | 7/2018 | Cannon .................. G02B 23/10 |
| 2019/0179130 A1 | 6/2019 | Miller et al. |

OTHER PUBLICATIONS

Deepak, Sampath et al., "The WISE Telescope and Scanner: Design Choices and Hardware Results", An Optical Believe it or Not: Key Lessons Learned II, Oct. 7, 2010, pp. 1-11.

Bongiovi R. P., et al., "Airborne LWIR Hyperspectral Measurements of Military Vehicles", Aerospace Applications Conference, 1996, Proceedings., vol. 3, Feb. 3, 1996, pp. 121-135.

Extended European Search Report dated Dec. 9, 2021, issued during the proseuction of European Patent Application No. EP 21185055.7. 11 pages.

EP Communicaton Pursuant to Art. 94(3) EPC, dated Dec. 4, 2023, issued during the prosecution of European Patent Application No. EP 21185055.7.

* cited by examiner

MODULAR RECONFIGURABLE OPTICAL SYSTEMS FOR SUPPORTING MULTIPLE MODALITIES

CROSS-REFERENCE TO RELATED APPLICATIONS

This application claims benefit of priority to U.S. Provisional Patent Application No. 63/050,259 filed Jul. 10, 2020 the disclosure of which is incorporated by reference in its entirety.

BACKGROUND

1. Field

The present disclosure relates to optics, and more particularly to multi-modal optical systems.

2. Description of Related Art

In any combat mission environment, there is always the potential to encounter hostile forces. As of the turn of the century, the military has employed the use of drones to detect and neutralize opposing forces before engagement with friendly troops resulting in reduced casualties. In that scenario, the survival of the low and mid-altitude drones can be compromised due to ammunition fire from hostile forces. The need is for low cost sensors for drones.

Design and implementation of sensors used for mid- to low altitude applications can pose a number technical challenges such as the following.

1. The sensors are typically placed in a pod or ball with one large window, and some smaller windows to accommodate multiple fields-of-view if they are required;
2. The sensors should be able to perform detection operations both day and night;
3. The sensors should be able to gather various types of information using multiple modalities such as (but not limited to) hyperspectral, multispectral, FMV (full motion video), MWIR (midwave infrared), LWIR (long wave infrared), SWIR (short wave infrared) and LIDAR; and/or
4. The sensors should be of low-cost materials and assembly processes to minimize losses when placed in high risk areas.

The conventional techniques have been considered satisfactory for their intended purpose. However, there is an ever present need for improved systems and methods for optical systems. This disclosure provides a solution for this need.

SUMMARY

An optical system includes an off-axis folded three mirror anastigmat (TMA) telescope including a primary mirror for receiving scene energy from a scene. A secondary mirror is aligned to receive reflected energy from the primary mirror. A fold mirror is aligned to receive reflected energy from the secondary mirror. A tertiary mirror is aligned to receive reflected energy from the fold mirror and to direct energy between the secondary mirror and the fold mirror. A beam splitter is aligned to receive energy reflected from the tertiary mirror, to reflect a portion of that energy to a first imaging sensor, and to pass a second portion of that energy to a second imaging sensor.

The first imaging sensor can be sensitive to a first modality of wavelengths, and the second imaging sensor can be sensitive to a second modality of wavelengths that is different from the first modality of wavelengths. Each of the first modality and the second modality can include at least one of hyperspectral, multispectral, FMV (full motion video), MWIR (midwave infrared), LWIR (long wave infrared), SWIR (short wave infrared) and LIDAR. The first and second sensors can be affixed to at least one interchangeable module configured to separate from the TMA telescope to change modalities of the system.

The primary mirror and the secondary mirror can be aligned and configured to form an intermediate image between the fold mirror and the tertiary mirror. The primary mirror, secondary mirror, fold mirror, and tertiary mirror can be configured to form an exit pupil further from an optical axis of the primary mirror than the secondary mirror and the fold mirror.

A by-pass mirror can be configured to move relative to the primary mirror between a first position and a second position. In the first position, the by-pass mirror can by-pass the primary mirror and can direct energy directly to the beamsplitter for wide field of view (WFOV) imaging. In the second position, the by-pass mirror can be stowed from reflecting energy in the telescope.

At least one of the primary mirror, secondary mirror, fold mirror, and/or tertiary mirror can be of single point diamond turning (SPDT) aluminum construction. Consequently, the TMA telescope can have an afocal interface between the TMA telescope and the first and second sensors. The TMA telescope can have an interface that can be primarily sensitive to tilt and rotation to facilitate changing sensor modules. The telescope, beamsplitter, first sensor, and second sensor can be housed within a single pod or ball, wherein the single pod or ball has a single window for allowing scene energy from the scene into the pod or ball.

A method includes changing one or both of a first sensor and a second sensor out of an optical system including a single telescope that forms an image on each of the first and second sensors, wherein changing one or both of the first sensor and the second sensor includes not changing front end optics including the telescope.

Changing one or both of the first sensor and the second sensor can include removing a module from the optical system, wherein the module includes the first sensor, the second sensor, and a beamsplitter configured to split energy from the telescope to the first sensor and to the second sensor.

The method can include at least one of replacing the first sensor with a first replacement sensor that has a different modality from the first sensor, and/or replacing the second sensor with a second replacement sensor that has a different modality from the second sensor.

The method can include at least one of replacing only the first sensor in the field with a first replacement sensor, and bore sighting the first replacement sensor with the second sensor with a collimator in the field or in flight; replacing the first sensor with a first replacement sensor, replacing the second sensor with a second replacement sensor, and bore sighting the first and second replacement sensors to each other with a collimator in the field or in flight; or bore sighting a first replacement sensor with a second replacement sensor with a bench collimator not in the field, and then replacing the first and second sensors with the first and second replacement sensors.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
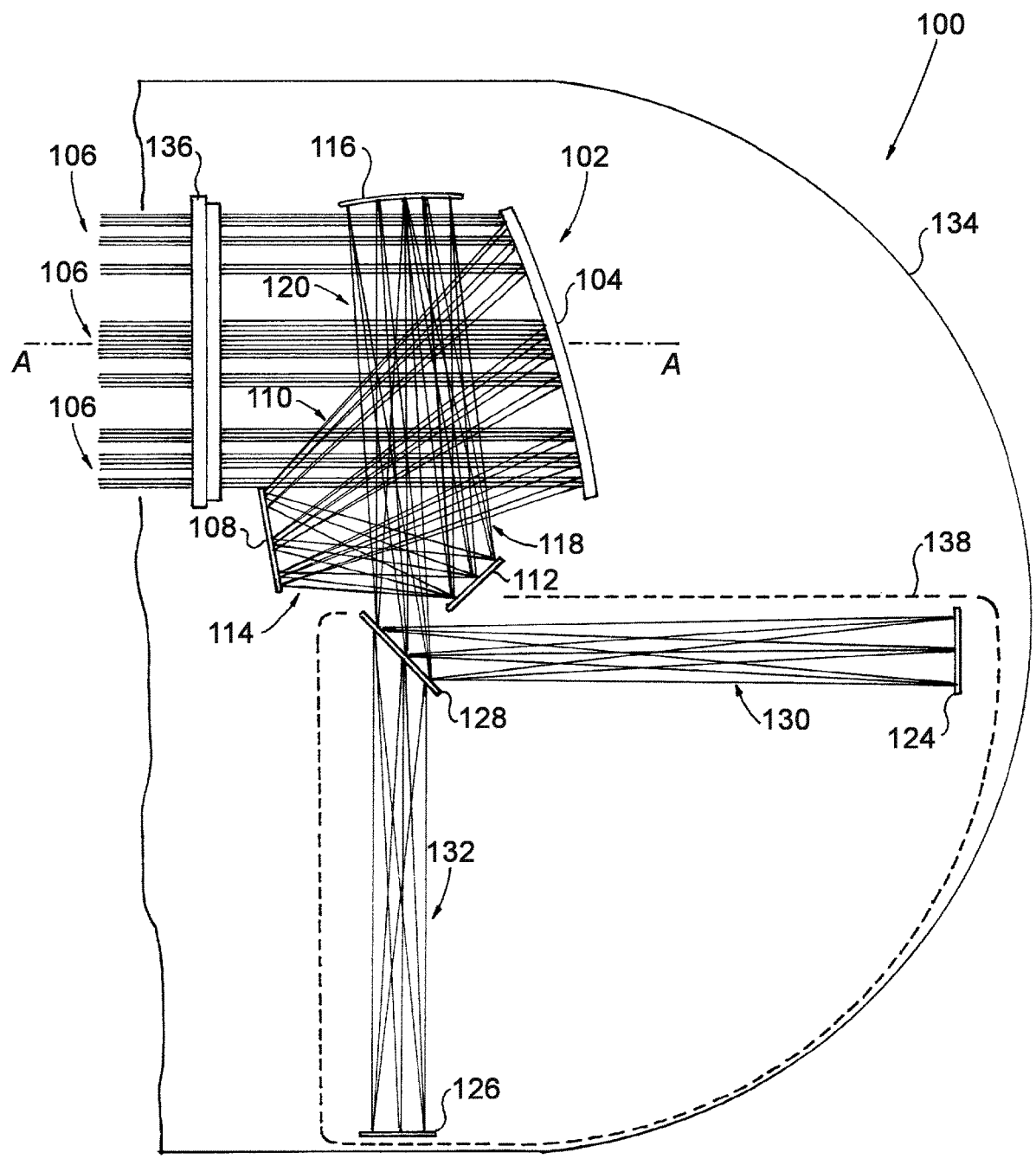
FIG. 1 is a schematic view of an embodiment of a system constructed in accordance with the present disclosure, showing the telescope and sensors in a ball or pod.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used for low cost modular, reconfigurable optical systems for supporting multiple modalities.

The optical system 100 includes an off-axis folded three mirror anastigmat (TMA) telescope 102 including a primary mirror 104 for receiving radiant energy or light 106 (represented by lines indicating the centers of ray traces in the Figures) from a scene. A secondary mirror 108 is aligned to receive reflected rays 110 from the primary mirror 104. A fold mirror 112 is aligned to receive reflected rays 114 from the secondary mirror 108. A tertiary mirror 116 is aligned to receive reflected rays 118 from the fold mirror 112 and to direct rays 120 to pass between the secondary mirror 108 and the fold mirror 112.

The primary mirror 104 and the secondary mirror 108 are aligned and configured to form an intermediate image (not pictured, but shown in the ray traces of rays 118 in FIG. 1) between the fold mirror 112 and the tertiary mirror 116. There is an optical axis A defined centered in and parallel to the rays 106 coming in from the scene to the primary mirror 104. The primary mirror 104, secondary mirror 108, fold mirror 112, and tertiary mirror 116 are configured to form an exit pupil 122 (not labeled in FIG. 1, but see FIGS. 2-3) that is further from an optical axis A of the primary mirror 104 than are the secondary mirror 108 and the fold mirror 112. This exit pupil 122 in this sense is external to the telescope 102, which facilitates changing modules as further discussed below. The TMA telescope 102 has an afocal interface between the TMA telescope 102 and the first and second sensors 124, 126. The TMA telescope or interface 102 can be mainly sensitive to tilt and rotation relative to folded optical axis B to facilitate changing sensor modules as discussed further below. The primary, secondary, and tertiary mirrors 104, 108, 116 are contoured for the optical performance described herein, and the fold mirror 112 is planar.

A dichroic beam splitter 128 is aligned to receive energy or rays 120 reflected from the tertiary mirror, to reflect a portion of those rays to the first imaging sensor 124, e.g. along a daytime path of rays 130, and to pass a second portion of those rays 120 to the second imaging sensor 126, e.g., along a nighttime path of rays 132, as an example of one possible configuration. The first imaging sensor 124 is sensitive to a first modality of wavelengths, e.g. wavelengths useful for daytime imagine, and the second imaging sensor 126 is sensitive to a second modality of wavelengths that are different from the first modality of wavelengths, e.g. the second modality of wavelengths can be wavelengths useful for nighttime imaging. It is contemplated that the first and second sensors 124, 126 can be sensitive to any suitable modalities such as hyperspectral, multispectral, FMV (full motion video), MWIR (midwave infrared), LWIR (long wave infrared), SWIR (short wave infrared) and LIDAR. The TMA telescope 102 supports these modalities at low cost because the primary mirror, secondary mirror, fold mirror, and/or tertiary mirror can be of single point diamond turning (SPDT) aluminum construction that can be coated to reflect the spectrum sufficient to support the aforementioned modalities.

The telescope 102, beamsplitter 128, first sensor 124, and second sensor 126 are housed within a single pod or ball 134, e.g., aboard an aircraft such as a drone. The single pod or ball 134 has a single window 136 for allowing rays 106 from the scene into the pod or ball 134.

A method includes changing one or both of first sensor, e.g. first sensor 124, and a second sensor, e.g., second sensor 126, out of an optical system, e.g. system 100, including a single telescope, e.g. TMA telescope 102, that forms an image on each of the first and second sensors. The first and second sensors 124, 126 are affixed to at least one interchangeable module 138 configured to separate from the TMA telescope 102 and from the pod or ball 134 to change modalities of the system 100. For example, each sensor can be affixed within a single interchangeable module 138 as shown in FIG. 1, or each sensor 126, 124 can be mounted in a separate respective interchangeable module. Since the beamsplitter 128 must redirect the wavelengths appropriate to the candidate sensors 124, 126, the beamsplitter coating for each sensor(s) configuration must have its own beamsplitter 128. Therefore, the beamsplitter 128 may need to be replaced, e.g. as part of the at least one interchangeable module 138, to accommodate multiple different configurations when changing the sensors 124, 126. Removing the sensors 124, 126 is done without changing the front end optics, e.g., without changing the pod or ball 134, the window 136, or including the telescope 102, i.e. the primary mirror 104, secondary mirror 108, fold mirror 112, and tertiary mirror 116.

After the module, e.g. module 138, is removed, the method can include replacing at least one of the first and second sensors 124, 126 with a respective replacement sensor that has a different modality from the sensor 124, 126 being replaced. This allows the modality of the first sensor 124 and or second sensor 126 to be changed in the field without having to change out any of the front end optics, which increases the modalities that system 100 can support relative to the state of the art.

If only one of the sensors 124, 126 is being replaced, the method can include bore sighting the replacement sensor with the non-replaced sensor 124, 126 using a collimator in the field or in flight. If both sensors 124, 126 are being replaced, the replacement sensors can be bore sighted in the field using a collimator, or on a bench, e.g. using a collimator to boresight the two replacement sensors 124, 126 mounted in the replacement module 138 on a test bench remote from the field prior to installation of the replacement module 138 into the system 100.

Figure 2:
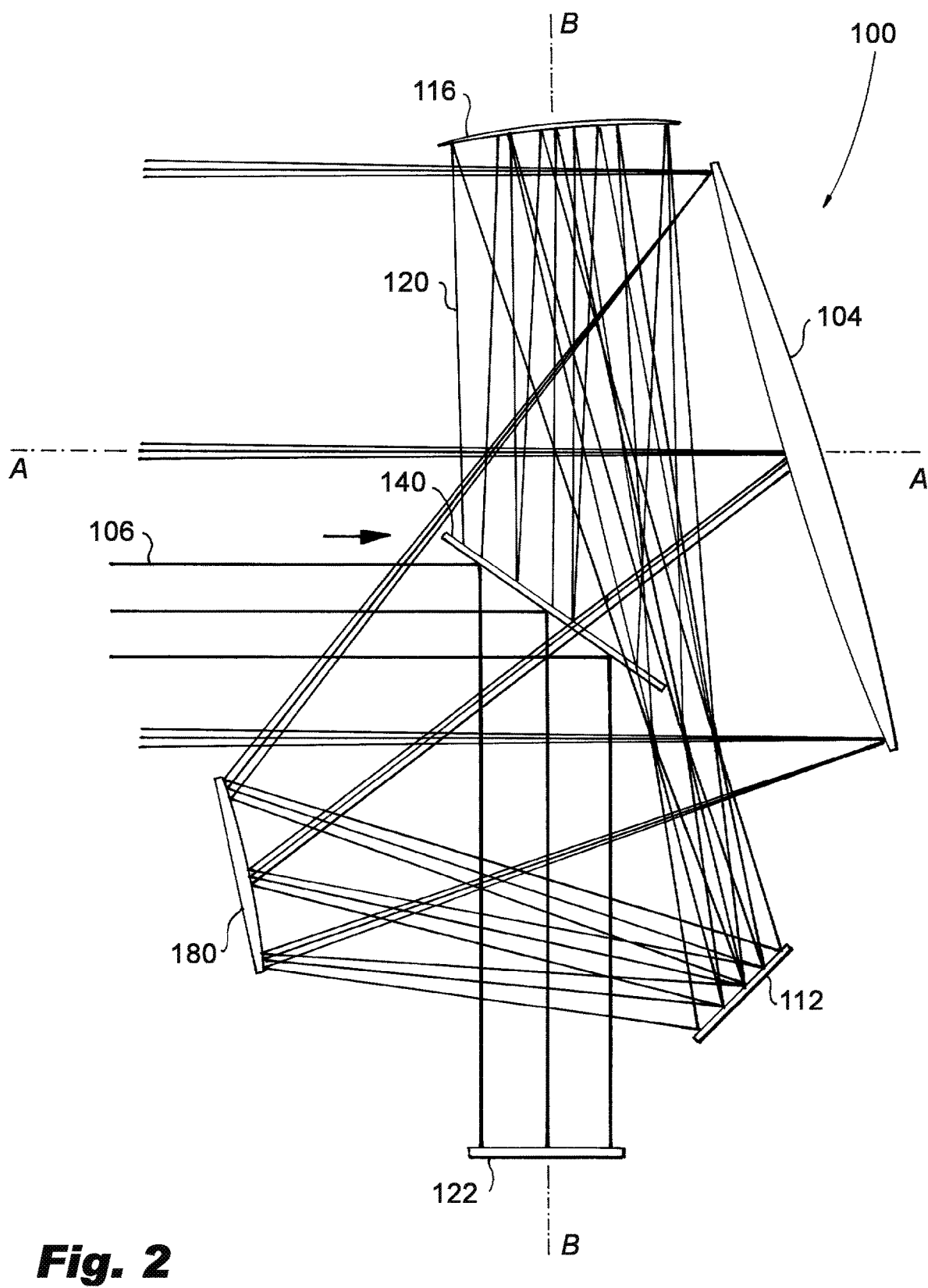
FIG. 2 is a schematic view of a portion of the system of FIG. 1, showing an optional by-pass mirror in the by-pass position.
Figure 3:
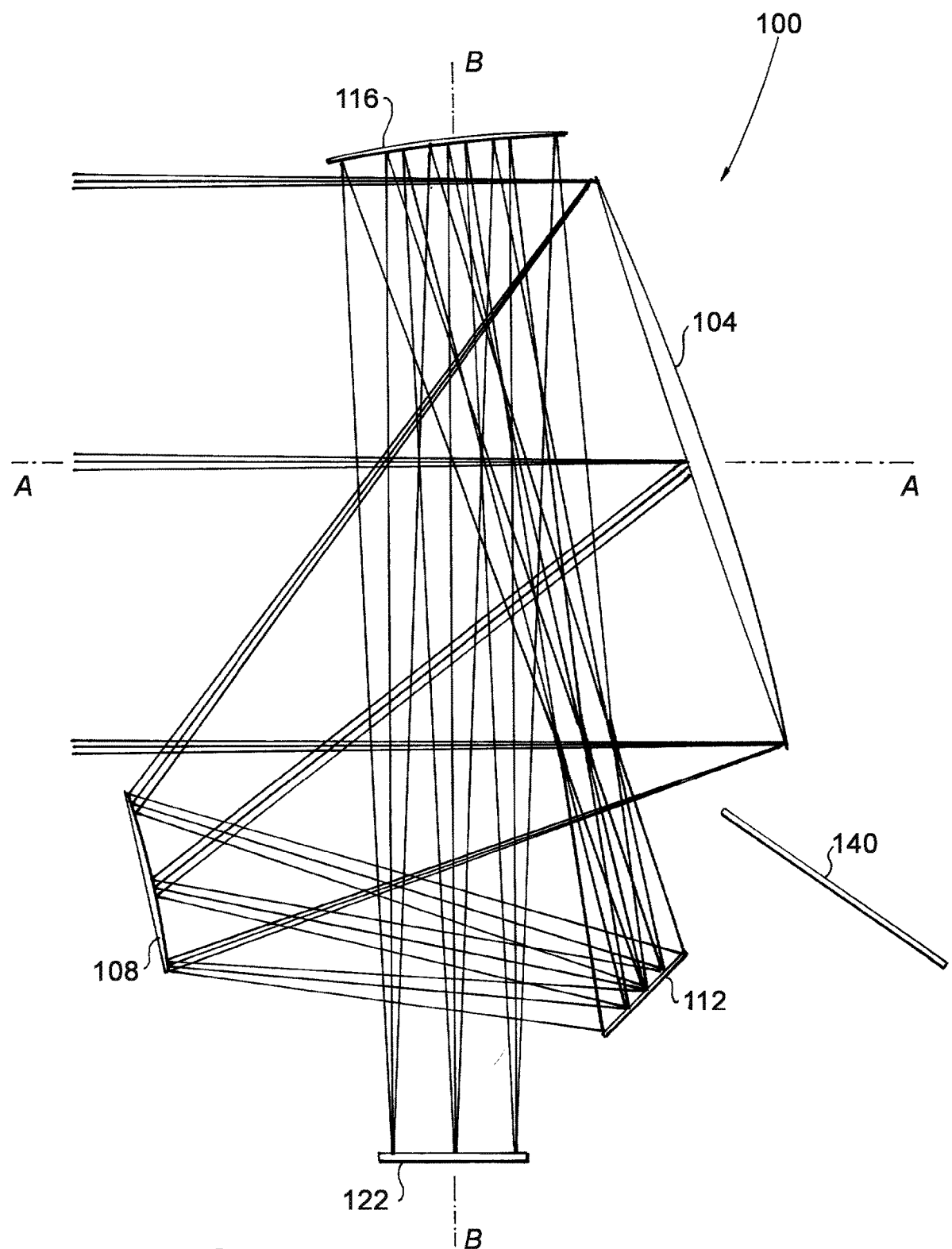
FIG. 3 is a schematic view of a portion of the system of FIG. 1, showing the optional by-pass mirror in the stowed position.

With reference now to FIG. 2, an optional by-pass mirror 140 can be included in system 100. The by-pass mirror 140 is configured to move relative to the primary mirror 104 between a first position, shown in FIG. 2, and a second position, shown in FIG. 3. In the first position, shown in FIG. 3, the by-pass mirror 140 by-passes the primary mirror 104 and directs or reflects rays 106 directly to the exit pupil 122 and the beamsplitter 128 (labeled in FIG. 1) for wide field of view (WFOV) imaging. In this position, the by-pass mirror 140 blocks scene energy (represented by rays 120) from the tertiary mirror so it does not reach the exit pupil 122 or beamsplitter 128. In the second position, shown in FIG. 3, the by-pass mirror 140 is stowed outside of the path of the rays 106, 110, 114, 118, 120 in the telescope 102, and so does not reflect or block any of the rays 106, 110, 114, 118, 120 in the telescope 102. This position allows for narrow field of view (NFOV) modalities. The TMA telescope 102 does not have obscuration in the NFOV modality as with a Cassegrain telescope, which is an advantage for improved energy collection and mid-spatial frequency contrast. The WFOV modality allows for NFOV and WFOV modalities to use a single window.

The methods and systems of the present disclosure, as described above and shown in the drawings, provide for low cost modular, reconfigurable optical systems for supporting multiple modalities. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An optical system comprising:
    an off-axis folded three mirror anastigmat (TMA) telescope including a primary mirror configured to receive scene energy, a secondary mirror configured to receive reflected energy from the primary mirror, a fold mirror configured to receive reflected energy from the secondary mirror, and a tertiary mirror configured to receive reflected energy from the fold mirror and to direct energy between the secondary mirror and the fold mirror; and
    an interchangeable module configured to be removably connected to the TMA telescope, the interchangeable module comprising:
        a first imaging sensor that is sensitive to a first modality of wavelengths;
        a second imaging sensor that is sensitive to a second modality of wavelengths; and
        a removable beam splitter configured to receive energy reflected from the tertiary mirror, to reflect a portion of that energy to the first imaging sensor, and to pass a second portion of that energy to the second imaging sensor, wherein the removable beam splitter includes a coating configured to accommodate wavelength sensitivities of the first imaging sensor and the second imaging sensor;
    wherein the interchangeable module is removable and replaceable with a second interchangeable module comprising:
        a third imaging sensor that is sensitive to a third modality of wavelengths; and
        a fourth imaging sensor that is sensitive to a fourth modality of wavelengths.

2. The system as recited in claim 1, wherein each of the first modality of wavelengths and the second modality of wavelengths includes at least one of: hyperspectral, multi-spectral, FMV (full motion video), MWIR (midwave infrared), LWIR (long wave infrared), SWIR (short wave infrared), or LIDAR (light detection and ranging) wavelengths.

3. The system as recited in claim 1, wherein the primary mirror and the secondary mirror are aligned and configured to form an intermediate image between the fold mirror and the tertiary mirror.

4. The system as recited in claim 1, wherein the primary mirror, secondary mirror, fold mirror, and tertiary mirror are configured to form an exit pupil further from an optical axis of the primary mirror than the secondary mirror and the fold mirror.

5. The system as recited in claim 1, further comprising:
    a by-pass mirror configured to move relative to the primary mirror between a first position and a second position;
    wherein, in the first position, the by-pass mirror is configured to by-pass the primary mirror and direct rays directly to the beam splitter for wide field of view (WFOV) imaging; and
    wherein, in the second position, the by-pass mirror is stowed from reflecting rays in the TMA telescope.

6. The system as recited in claim 1, wherein at least one of the primary mirror, secondary mirror, fold mirror, or tertiary mirror is of single point diamond turning (SPDT) aluminum construction.

7. The system as recited in claim 1, wherein the TMA telescope has an afocal interface between the TMA telescope and the first and second imaging sensors.

8. The system as recited in claim 7, wherein the TMA telescope has an interface that is sensitive to tilt and rotation to facilitate changing the first imaging sensor and the second imaging sensor.

9. The system as recited in claim 7, wherein the TMA telescope and the interchangeable module are housed within a single pod or ball, and wherein the single pod or ball has a single window configured to allow the scene energy into the pod or ball.

10. A method comprising:
    obtaining an off-axis folded three mirror anastigmat (TMA) telescope including a primary mirror configured to receive scene energy, a secondary mirror configured to receive reflected energy from the primary mirror, a fold mirror configured to receive reflected energy from the secondary mirror, and a tertiary mirror configured to receive reflected energy from the fold mirror and to direct energy between the secondary mirror and the fold mirror; and
    changing both of a first imaging sensor and a second imaging sensor out of the TMA telescope that forms an image on each of the first and second imaging sensors, wherein an interchangeable module is configured to be removably connected to the TMA telescope, the interchangeable module comprising:
        the first imaging sensor, which is sensitive to a first modality of wavelengths;
        the second imaging sensor, which is sensitive to a second modality of wavelengths; and
        a removable beam splitter configured to receive energy reflected from the tertiary mirror, to reflect a portion of that energy to the first imaging sensor, and to pass a second portion of that energy to the second imaging sensor, wherein the removable beam splitter includes a coating configured to accommodate wavelength sensitivities of the first imaging sensor and the second imaging sensor;

wherein changing both of the first imaging sensor and the second imaging sensor comprises replacing the interchangeable module with a second interchangeable module, the second interchangeable module comprising:
 a third imaging sensor that is sensitive to a third modality of wavelengths; and
 a fourth imaging sensor that is sensitive to a fourth modality of wavelengths; and wherein replacing the interchangeable module with the second interchangeable module includes not changing front end optics including the TMA telescope.

11. The method as recited in claim 10, wherein replacing the interchangeable module with the second interchangeable module comprises at least one of:
 replacing the first imaging sensor having one of a daytime or nighttime modality with the third imaging sensor having another of the daytime or nighttime modality; or
 replacing the second imaging sensor having one of the daytime or nighttime modality with the fourth imaging sensor having another of the daytime or nighttime modality.

12. The method as recited in claim 10, wherein replacing the interchangeable module with the second interchangeable module comprises at least one of:
 replacing the first imaging sensor with the third imaging sensor, replacing the second imaging sensor with the fourth imaging sensor, and bore sighting the third and fourth imaging sensors to each other with a collimator in the field or in flight; or
 bore sighting the third imaging sensor with the fourth imaging sensor with a bench collimator not in the field and then replacing the first and second imaging sensors with the third and fourth imaging sensors.

13. An optical system comprising:
 an off-axis folded three mirror anastigmat (TMA) telescope including a primary mirror configured to receive scene energy, a secondary mirror configured to receive reflected energy from the primary mirror, a fold mirror configured to receive reflected energy from the secondary mirror, and a tertiary mirror configured to receive reflected energy from the fold mirror and to direct energy between the secondary mirror and the fold mirror;
 a first interchangeable module configured to be removably connected to the TMA telescope, the first interchangeable module comprising a first imaging sensor sensitive to at least a first plurality of wavelengths and a second imaging sensor sensitive to at least a second plurality of wavelengths, wherein the first interchangeable module is removable and replaceable with a second interchangeable module comprising a third imaging sensor sensitive to at least a third plurality of wavelengths and a fourth imaging sensor sensitive to at least a fourth plurality of wavelengths;
 a pod configured to house the TMA telescope and the first interchangeable module within the pod; and
 a single window configured to allow scene energy into the pod to the TMA telescope.

14. The system as recited in claim 13, wherein the primary mirror and the secondary mirror are aligned and configured to form an intermediate image between the fold mirror and the tertiary mirror.

15. The system as recited in claim 13, wherein the primary mirror, secondary mirror, fold mirror, and tertiary mirror are configured to form an exit pupil further from an optical axis of the primary mirror than the secondary mirror and the fold mirror.

16. The system as recited in claim 13, wherein the TMA telescope has an afocal interface between the TMA telescope and first and second imaging sensors of the first interchangeable module.

17. The system as recited in claim 13, wherein the TMA telescope has an interface that is sensitive to tilt and rotation to facilitate changing the first interchangeable module.

18. The system as recited in claim 13, further comprising:
 an interchangeable beam splitter configured to receive energy reflected from the tertiary mirror, reflect a portion of that energy to the first imaging sensor, and pass a second portion of that energy to the second imaging sensor;
 wherein the interchangeable beam splitter includes a coating configured to accommodate wavelength sensitivities of the first imaging sensor and the second imaging sensor; and
 wherein the interchangeable beam splitter is removable and replaceable with a second interchangeable beam splitter including a second coating configured to accommodate the wavelength sensitivities of the third imaging sensor and the fourth imaging sensor.

19. The system as recited in claim 13, wherein:
 the first imaging sensor is configured for daytime imaging; and
 the second imaging sensor is configured for nighttime imaging.

* * * * *